United States Patent Office 3,274,226
Patented Sept. 20, 1966

3,274,226
BIS(ALKOXYISOCYANATOPHENYL)METHANE
COMPOUNDS
Frank Long, Trevor, Wrexham, and Ryland James Roberts, Glynceiriog, near Wrexham, Wales, assignors to Monstanto Chemicals Limited, London, England, a British company
No Drawing. Filed July 30, 1963, Ser. No. 298,569
Claims priority, application Great Britain, Aug. 28, 1962, 32,962/62
4 Claims. (Cl. 260—453)

This invention relates to new chemical compounds, in particular to new bis-isocyanates that are useful for example in the production of polymeric materials.

The new compounds of the invention are bis(alkoxyisocyanatophenyl)methanes in which in each phenyl nucleus (i) the isocyanato group is in the 5- position and the alkoxy group is in the 2- position; or (ii) the isocyanato group is in the 3- position and the alkoxy groups is in the alkoxy group is in the 2- position; or (iii) the isocyanato group is in the 4- position and the alkoxy group is in the 3- position, the alkoxy group being one that contains two or more carbon atoms.

The invention includes a process for the production of a new bis(alkoxyisocyanatophenyl)methane of the invention, in which an appropriate bis(alkoxyaminophenyl)methane is reacted with phosgene. Where the new compound is for example a bis(alkoxyisocyanatophenyl)methane in which in each phenyl nucleus the isocyanato group is in the 5-position and the alkoxy group is in the 2- position, that is to say a bis(2-alkoxy-5-isocyanatophenyl)methane, the appropriate bis(alkoxyaminophenyl)methane is the corresponding bis(2-alkoxy-5-aminophenyl)methane. A bis(3-alkoxy-4-aminophenyl)methane is the appropriate starting material for the production of the corresponding bis(alkoxyisocyanatophenyl)methane in which in each phenyl nucleus the isocyanato group is in the 4-position and the alkoxy group is in the 3-position; and so on.

Also part of the invention is a process for the production of a polymeric material (for instance a polyurethane) in which a new compound of the invention is employed as a monomer or cross-linking agent.

An alkoxy group in a new compound of the invention can have either a straight or branched chain and can be for example a methoxy, ethoxy, isopropyloxy, n-hexyloxy, n-heptoyloxy, 2-ethylhexyloxy or n-decyloxy group; an ethoxy group is often preferred.

Examples of the new bis(alkoxyisocyanatophenyl)methanes are: bis(2-ethoxy-5-isocyanatophenyl)methane; bis(2-n-heptoyloxy-5-isocyanatophenyl)methane; bis(3-ethoxy-4-isocyanatophenyl)methane; and bis(2-ethoxy-3-isocyanatophenyl)methane.

Preferably in the production of a new bis(alkoxyisocyantophenyl)methane, the appropriate bis(alkoxyaminophenyl)methane is first converted to a hydrohalide salt, particularly a hydrochloride, which is then reacted with phosgene. It is usually preferable to conduct the process in an inert solvent, for instance a hydrocarbon or halogenated hydrocarbon; benzene and its homologues, for example the xylenes, are particularly suitable.

The reaction with phosgene is preferably carried out at an elevated temperature, for example a temperature in the range 50–150° C. Where a solvent having a suitable boiling point is employed, the process is conveniently conducted by boiling under reflux.

Where a new bis(alkoxyisocyanatophenyl)methane is used as a monomer or cross-linking agent in the production of a polymeric material, it can be condensed with for example a glycol such as for instance tetramethylene glycol, or a polyester or polyether resin having reactive hydroxyl groups.

The new bis(alkoxyisocyanatophenyl)methanes are also useful in the production of for instance adhesives and surface coatings.

The new compounds of the invention and the process for their production are illustrated by the following examples.

Example 1

This example describes the production of bis(2-ethoxy-5-isocyanatophenyl)methane.

Dry hydrogen chlorine gas was passed into a solution of 28.6 grams of bis(5-amino-2-ethoxyphenyl)methane in 400 cc. of xylene. Precipitation of the amine hydrochloride occurred, and passage of the gas was continued until this process was observed to be complete. The suspension of the hydrochloride was then stirred and boiled under reflux while phosgene was passed in. After three hours, a clear solution was obtained, indicating that the conversion of the hydrochloride was complete.

Evaporation of most of the xylene followed by addition of petroleum ether gave bis(2-ethoxy-5-isocyanatophenyl)methane as a crystalline solid having a melting point of 125–130° C.

On recrystallisation from petroleum ether (with charcoal treatment) the melting point was raised to 133–135° C. The yield of product was 64% of the theoretical.

(Found: C, 67.24; H, 5.52; $C_{19}H_{18}N_2O_4$ requires: C, 67.5; H, 5.32%.)

Example 2

Bis(3-ethoxy-4-isocyanatophenyl)methane was obtained in 79% of the theoretical yield from bis(4-amino-3-ethoxyphenyl)methane, hydrogen chloride and phosgene by a procedure essentially the same as that described in Example 1. The material was a pale yellow crystalline solid having a melting point of 121–123.5° C.

(Found: C, 67.38; H, 5.11; N, 8.31%. $C_{19}H_{18}N_2O_4$ requires: C, 67.45; H, 5.32; N, 8.28%.)

Example 3

This example describes the production of bis(2-ethoxy-3-isocyanatophenyl)methane.

Bis(2-ethoxy-3-aminophenyl)methane, required as starting material, was obtained as follows:

3.5 cc. of aqueous formaldehyde containing 36.4% by weight of $CH_2O$ were added over a period of 20 minutes to a stirred suspension of 13.2 grams of 4-bromo-2-nitrophenol in 3.4 cc. of water and 20 cc. of concentrated sulphuric acid. The reaction was exothermic and the temperature during this time rose from 20° C. to 52° C. The mixture was then heated to 90° C. and maintained at this temperature for 30 minutes. After cooling, water was added, giving a precipitate of crude bis(5-bromo-2-hydroxy-3-nitrophenyl)methane. This was purified by washing, steam distillation, and crystallisation from benzene, and was eventually obtained as 9.2 grams of light-brown crystals having a melting point of 194–195° C.

A solution of 7.1 grams of bis(5-bromo-2-hydroxy-3-nitrophenyl)methane and 4.95 grams of ethyl iodide in 200 cc. of methyl ethyl ketone containing 4.3 grams of anhydrous potassium carbonate and a crystal of potassium iodide was boiled under reflux. After 6 hours, a further 4.95 grams of ethyl iodide were added, and refluxing was continued for 24 hours. Most of the ketone was then distilled off, and 300 cc. of water were added. The suspension of solid thus obtained was filtered, and the solid was washed with dilute sodium hydroxide solution and then with water. The solid was dried and crystallised from a mixture of carbon tetrachloride and 60–80 petroleum ether, giving 2 grams of bis(5-bromo-2-ethoxy-3-nitrophenyl)methane as pale yellow crystals having a melting point of 97–98° C.

1.9 grams of these crystals were dissolved in 100 cc. of ethanol, and 0.1 gram of 5% palladium on carbon and 0.2 gram of 5% palladium on calcium carbonate were added. The suspension was shaken in an atmosphere of hydrogen at atmospheric pressure and temperature until the theoretical amount of hydrogen had been absorbed. The suspension was then filtered, dry benzene was added to the filtrate, and the solvents, together with the water formed during the reaction, were removed by distillation. Distillation of the residue under reduced pressure gave bis(2-ethoxy-3-aminophenyl)methane as an oil having a boiling range of 190–198° C. at a pressure of 0.8 mm. of mercury.

Bis(2-ethoxy-3-aminophenyl)methane was converted to bis(2-ethoxy-3-isocyanatophenyl)methane by a procedure essentially the same as that described in Example 1.

What we claim is:

1. A compound selected from the group consisting of bis(2-alkoxy-5-isocyanatophenyl)methane, bis(2-alkoxy-3-isocyanatophenyl)methane, and bis(3-alkoxy-4-isocyanaotophenyl)methane wherein said alkoxy group has from 2 to 10 carbon atoms.
2. Bis(2-ethoxy-5-isocyanatophenyl)methane.
3. Bis(2-ethoxy-3-isocyanatophenyl)methane.
4. Bis(3-ethoxy-4-isocyanatophenyl)methane.

References Cited by the Examiner
UNITED STATES PATENTS

| | | | |
|---|---|---|---|
| 2,786,864 | 3/1957 | Wirth et al. | 260—453 |
| 2,888,438 | 5/1959 | Katz. | |
| 2,950,307 | 8/1960 | France et al. | 260—453 |

CHARLES B. PARKER, *Primary Examiner.*

DALE R. MAHANAND, *Assistant Examiner.*